United States Patent Office 3,592,951
Patented July 13, 1971

3,592,951
PROCESS FOR ALKYLATING A PHENOL
Edward F. Zaweski, Pleasant Ridge, Mich., assignor to
Ethyl Corporation, New York, N.Y.
No Drawing. Filed Dec. 28, 1967, Ser. No. 694,107
Int. Cl. C07c *39/06*
U.S. Cl. 260—624                    5 Claims

ABSTRACT OF THE DISCLOSURE

The reaction of from about 1 to 2 mole equivalents of a phenol unsubstituted in at least one position ortho or para to the phenolic hydroxyl group with about 2 mole equivalents of formaldehyde and about one mole equivalent of ethylenediamine effects nuclear methylation of the phenol. For example, the reaction of 2 moles of 2,6-di-tert-butylphenol with 2 moles of formaldehyde and one mole of ethylenediamine forms 2,6-di-tert-butyl-p-cresol. The products are useful as antioxidants.

BACKGROUND

The reaction of phenols with formaldehyde and primary or secondary amines has been carried out for many years to produce hydroxybenzyl amines. This is the well-known Mannich reaction (Roger Adams et al., "Organic Reactions," vol. I, pp. 303–341, John Wiley and Sons, New York, 1942). As stated above, the products known to be produced when this reaction is carried out with a phenol are hydroxybenzyl amines. It has now been discovered that when the process is conducted employing a specified mole ratio of reactants and a particular amine, the reaction results in nuclear methylation of the phenol.

SUMMARY

This invention relates to a process for alkylating a phenol unsubstituted in at least one position ortho or para to the phenolic hydroxyl group. In particular, this invention relates to a process for making 2,6-di-tert-butyl-p-cresol, which is useful as an antioxidant.

DESCRIPTION OF THE PREFERRED EMBODIMENTS

An object of this invention is to provide a method of methylating a phenol nucleus. This and other objects are accomplished by providing a process comprising reacting about 1 to 2 mole equivalents of a phenol having the formula:

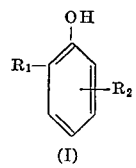

(I)

wherein $R_1$ and $R_2$ are selected from the group consisting of alkyl radicals containing 1 to 12 carbon atoms, cycloalkyl radicals containing 6 to 12 carbon atoms and aralkyl radicals containing 7 to 12 carbon atoms, with about one mole equivalent of ethylenediamine and about 2 mole equivalents of formaldehyde at a temperature of from about 50–200° C.

A broad range of phenols having Formula I can be used in this process. Some examples are:

6-tert-butyl-o-cresol
2,4-dicyclohexylphenol
2-sec-dodecyl-p-cresol
6-(α,α-dimethylbenzyl)-o-cresol
2,6-(α-methylbenzyl)phenol
2-tert-butyl-6-isopropylphenol
2,6-dimethylphenol
2,4-dimethylphenol The more preferred phenols are those in which $R_2$ in Formula I is bonded to the phenol nucleus at the position ortho to the phenol hydroxyl radical. These phenols have the formula:

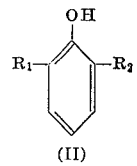

(II)

wherein $R_1$ and $R_2$ are the same as above. Examples of these phenols are 2,6-di-tert-butylphenol, 2,6-diisopropylphenol, 2,6-di-sec-butylphenol, 2,6-dicyclohexylphenol, 2,6-di(α-methylbenzyl)phenol, and the like. The most preferred phenol reactant is 2,6-di-tert-butylphenol.

The ratio of reactants is critical. When substantially less than the required amount of formaldehyde is employed the major product is a N,N,N′,N′-tetrakis(hydroxybenzyl)ethylenediamine. Likewise, when a substantial excess of the phenol is used in conjunction with exceess formaldehyde, nuclear alkylation does not occur to any substantial amount. The mole ratio must be from about 1 to 2 moles of phenol, about 2 moles of formaldehyde, and about one mole of ethylenediamine. The best results have been obtained by reacting about one mole of the phenol wtih about 2 moles of formaldehyde and one mole of ethylenediamine.

The reaction can be carried out by merely mixing the reactants and heating them to the desired reaction temperature. A useful temperature range is from about 50–200° C. A preferred temperature range is from about 50–150° C. At higher temperatures a pressure vessel can be used to prevent the evaporation of the reactants and products.

Although a solvent is not required, they are frequently used to aid in the mixing of the reactants. Useful solvents are those that are substantially inert under the reaction conditions, but which have at least some solvent effect on the reactants. Examples are ethers such as diethyl ether, tetrahydrofuran, dioxane, diethyleneglycol dimethyl ether, and the like. More preferred solvents are the secondary and tertiary alkanols, especially the lower alcohols containing from 3 to about 6 carbon atoms. Examples of these are isopropanol, sec-butanol, tert-butanol, sec-isoamyl alcohol, tert-amyl alcohol, and the secondary and tertiary hexanols.

The following examples illustrate methods of carrying out the process and also the criticality of the mole ratio of reactants. All parts are by weight.

Example 1

In this reaction the mole ratio of reactants was one mole of phenol, one mole of formaldehyde and one mole of ethylenediamine. This ratio is outside the scope of the present inevntion.

To a reaction vessel fitted with a stirrer, condenser, thermometer, and provided with a nitrogen atmosphere was added 41.2 parts of 2,6-di-tert-butylphenol, 175 parts of isopropanol and 16.7 parts of 36 percent aqueous formaldehyde. Following this, 12 parts of ethylenediamine were added, causing the temperature to rise from 22° to 30° C. The reaction mixture was then heated to reflux and maintained at reflux for 123 hours. The volatiles were then removed from the reaction mixture at about 100° C. under vacuum, leaving a viscous oil. The oil was recrystallized by dissolving it in isopropanol and slowly adding water until solids formed. The solids were recrystallized in the same manner, yielding a product melting at 204–

205° C. which was identified by infrared analysis, NMR and elemental analysis as N,N,N',N'-tetrakis(3,5-di-tert-butyl-4-hydroxybenzyl)ethylenediamine.

Example 2

In this reaction the mole ratio of reactants was 4 moles of a phenol, 4 moles of formaldehyde and one mole of ethylenediamine. This ratio is also outside the scope of the present invention.

In the reaction vessel of Example 1 was placed 4 mole parts of 2,6-di-tert-butylphenol, 4 mole parts of formaldehyde as a 36 percent aqueous solution, one mole part of ethylenediamine and 1700 parts of isopropyl alcohol. The mixture was refluxed 91 hours and the principal product recovered was N,N,N',N'-tetrakis(3,5-di-tert-butyl-4-hydroxybenzyl)ethylenediamine.

Example 3

This reaction was carried out at a mole ratio of one mole of a phenol, 2 moles of formaldehyde and one mole of ethylenediamine. This ratio is within the present invention.

To the reaction vessel described in Example 1 was added one mole part of 2,6-di-tert-butylphenol, 2 mole parts of 36 percent aqueous formaldehyde, one mole part of ethylenediamine and 800 parts of isopropyl alcohol. The mixture was stirred and refluxed for 31 hours, resulting in a 64 percent yield of 2,6-di-tert-butyl-p-cresol.

Example 4

This reaction was carried out at a ratio of 2 moles of a phenol, 2 moles of formaldehyde and one mole of ethylenediamine. This ratio is within the present invention.

To the reaction vessel described in Example 1 was added 2 mole parts of 2,6-di-tert-butylphenol, 2 mole parts of 36 percent aqueous formaldehyde, one mole part of ethylenediamine and 800 parts of isopropyl alcohol. The mixture was stirred and refluxed for 148 hours. Vapor phase chromatographic analysis served to identify the major product as 2,6-di-tert-butyl-p-cresol. This product can be recovered by distillation of the reaction product at reduced pressure.

Example 5

In a pressure reaction vessel place one mole part of 2,6-di(α-methylbenzyl)phenol, 2 mole parts of para-formaldehyde and one mole part of ethylenediamine. Seal the vessel, and while stirring, heat to 200° C. Hold at this temperature for one hour and then cool to about 100° C., and discharge the reaction vessel. Wash the reaction product with water to remove water-soluble material and then distill the remainder under vacuum to recover 2,6-di(α-methylbenzyl)-p-cresol.

Other phenols can be employed in the above example with good results, such as 2,6-di-tert-butylphenol, 2,4-di-tert-butylphenol, 2,6-di-sec-butylphenol, 2,4-dimethylphenol, 2,4-di(α,α-dimethylbenzyl)phenol, and 2,6-dicyclohexylphenol.

Example 6

In a reaction vessel place one mole part of 2-methyl-6-sec-dodecylphenol, 2 mole parts of para-formaldehyde, one mole part of ethylenediamine and 700 parts of tert-butyl alcohol. Heat to reflux while stirring and reflux for 10 hours. Cool to 50° C. and add 200 parts of water. Remove the aqueous alcohol layer and distill the remaining product under vacuum to recover 2,4-dimethyl-6-sec-dodecylphenol.

The methylated phenols made by this process are useful antioxidants in a broad range of organic materials such as natural rubber, polyethylene, polypropylene, lard, corn oil, lubricating oil, styrene-butadiene rubber, poly-cis-butadiene, and the like. The following example illustrates one method of using a preferred product made by this invention, namely, 2,6-di-tert-butyl-p-cresol.

Example 7

To a synthetic rubber master batch comprising 100 parts of styrene-butadiene rubber (50–50 S/B ratio) having an average molecular weight of 60,000, 50 parts of zinc propionate-stearate, 50 parts of carbon black, 5 parts of road tar, 2 parts of sulfur and 1.5 parts of mercaptobenzothiazole is added 1.5 parts of 2,6-di-tert-butyl-p-cresol. After thorough blending, the master batch is used to fabricate a tire carcass which is cured for 60 minutes at 45 p.s.i. steam pressure, giving a SBR rubber product of good stability.

I claim:

1. A process for alkylating a phenol, said process comprising reacting 1 to 2 mole equivalents of a phenol having the formula:

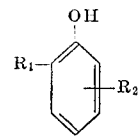

wherein $R_1$ and $R_2$ are selected from the group consisting of alkyl radicals containing 1 to 12 carbon atoms, cycloalkyl radicals containing 6 to 12 carbon atoms and aralkyl radicals containing 7 to 12 carbon atoms and wherein $R_2$ is bonded to the phenolic nucleus at a position ortho or para to the hydroxy group, with one mole equivalent of ethylenediamine and 2 mole equivalents of formaldehyde at a temperature of from about 50–150° C.

2. The process of claim 1 wherein $R_2$ is bonded to the phenol nucleus at the position ortho to the phenolic hydroxyl group.

3. The process of claim 2 wherein $R_1$ and $R_2$ are tert-butyl groups.

4. The process of claim 3 carried out in a solvent selected from the group consisting of secondary and tertiary alkanols containing from 3 to about 6 carbon atoms.

5. The process of claim 4 comprising reacting one mole equivalent of 2,6-di-tert-butylphenol with 2 mole equivalents of formaldehyde and one mole equivalent of ethylenediamine at a temperature of from about 50–150° C. in an isopropyl alcohol solvent.

References Cited

UNITED STATES PATENTS

| 2,841,623 | 7/1958 | Norton et al. | 260—624 |
| 2,841,624 | 7/1958 | Norton et al. | 260—624 |
| 3,030,428 | 4/1962 | Morris et al. | 260—624 |

JOHN D. RANDOLPH, Primary Examiner

W. B. LONE, Assistant Examiner

U.S. Cl. X.R.

260—619, 621; 252—404; 260—45.95